United States Patent
Wolfe

(10) Patent No.: US 6,401,855 B1
(45) Date of Patent: Jun. 11, 2002

(54) SEAT LOAD SENSING APPARATUS

(75) Inventor: George B. Wolfe, Plymouth, MI (US)

(73) Assignee: TRW Inc., Lyndhurst, OH (US)

( * ) Notice: Subject to any disclaimer, the term of this patent is extended or adjusted under 35 U.S.C. 154(b) by 34 days.

(21) Appl. No.: 09/615,860

(22) Filed: Jul. 13, 2000

(51) Int. Cl.[7] ................ B60D 1/28; B60R 21/32; G01G 19/08
(52) U.S. Cl. ................ 180/271; 280/735; 177/136
(58) Field of Search .............. 280/735; 180/271; 701/45; 177/136

(56) References Cited

U.S. PATENT DOCUMENTS

| | | | |
|---|---|---|---|
| 2,708,005 A | 5/1955 | Gazzo | |
| 3,022,976 A | 2/1962 | Zia | |
| 3,766,344 A | 10/1973 | Nevett | |
| 4,075,443 A | 2/1978 | Fatur | |
| 4,361,741 A | 11/1982 | Leskoverc et al. | |
| 5,232,243 A | 8/1993 | Blackburn et al. | |
| 5,481,078 A | 1/1996 | Asche | |
| 5,502,284 A | 3/1996 | Meiller et al. | |
| 5,542,493 A | 8/1996 | Jacobsen et al. | |
| 5,624,132 A | 4/1997 | Blackburn et al. | |
| 5,720,523 A | 2/1998 | Kawabata et al. | |
| 5,739,757 A | 4/1998 | Gioutos | |
| 5,810,392 A | 9/1998 | Gagnon | |
| 5,864,295 A | 1/1999 | Jarocha | |
| 5,877,677 A | 3/1999 | Fleming et al. | |
| 6,039,344 A | * 3/2000 | Mehney et al. | |
| 6,069,325 A | * 5/2000 | Aoki | |
| 6,231,076 B1 | * 5/2001 | Blakesley et al. | |
| 6,275,026 B1 | * 8/2001 | Becker | |
| 6,288,649 B1 | * 9/2001 | Wolfe | |
| 6,323,433 B1 | * 11/2001 | Aoki et al. | ................ 280/735 |
| 6,323,444 B1 | * 11/2001 | Aoki | ................ 280/735 |

* cited by examiner

*Primary Examiner*—Brian L. Johnson
*Assistant Examiner*—Joselynn Sliteris
(74) *Attorney, Agent, or Firm*—Tarolli, Sundheim, Covell, Tummino & Szabo L.L.P.

(57) ABSTRACT

A vehicle has a seat (2) for a vehicle occupant, a vehicle floor pan (4) for supporting the seat (2), and a load sensing apparatus (10). The apparatus (10) includes a vehicle seat frame (20), a bracket (30), a first member (60), a second member (70), a lever (90), and a sensor (99). The vehicle seat frame (20) supports a load of the vehicle occupant in the vehicle seat (2). The load of the vehicle occupant in the vehicle seat (2) is transmitted through the bracket (30) from the vehicle seat frame (20) to the vehicle floor pan (4). The first member (60) is interposed between the vehicle seat frame (20) and the bracket (30). The first member (60) is compressible as the seat frame (22) moves downward and is expandable as the seat frame (20) moves upward. The second member (70) is interposed between the vehicle seat frame (20) and the bracket (30). The second member (70) is compressible as the seat frame (20) moves upward and is expandable as the seat frame (20) moves downward. The lever (90) has a first end portion (92) movable with the seat frame (20) and a second end portion (94) associated with the bracket (30). The lever (90) bends as the seat frame (20) moves vertically relative to the bracket (30). The sensor (99) detects bending of the lever (90) and provides an output signal indicative of the amount of bending of the lever (90).

25 Claims, 4 Drawing Sheets

SEAT LOAD SENSING APPARATUS

TECHNICAL FIELD

The present invention relates to an apparatus for sensing a load, and more particularly, to an apparatus for sensing the load imparted to a vehicle seat by a vehicle occupant.

BACKGROUND OF THE INVENTION

A conventional vehicle occupant load sensing apparatus includes a load sensor placed between a vehicle seat frame and a support mount for the seat. The sensor is directly within the vertical load path of the occupant's weight and responds to the vertical loads imparted to the seat by the occupant of the seat. In addition, the sensor may respond to torque loads between the seat and the support mount. Since the seat frame and the support mount must withstand large torque loads (i.e., tilting of the seat frame during crash conditions), typically the sensor also must be constructed to withstand large torque loads.

This construction lessens the sensitivity of the sensor in the vertical load path. Thus, the sensor may not produce a reliable vertical load output signal.

A load sensing apparatus which decouples the torque and vertical loads would allow the construction of a load sensor that does not have to withstand torque loads and thereby may be more likely to produce an accurate occupant load output signal related to upward and downward loads in the vertical load path.

SUMMARY OF THE INVENTION

The present invention relates to an apparatus for use in a vehicle having a seat for a vehicle occupant and a vehicle floor pan for supporting the vehicle seat. The apparatus includes a vehicle seat frame, a bracket, a first member, a second member, a lever, and a sensor. The vehicle seat frame supports a load of the vehicle occupant in the vehicle seat. The load of the vehicle occupant in the vehicle seat is transmitted through the bracket from the vehicle seat frame to the vehicle floor pan. The first member is interposed between the vehicle seat frame and the bracket. The first member is compressible as the seat frame moves downward and is expandable as the seat frame moves upward. The second member is interposed between the vehicle seat frame and the bracket. The second member is compressible as the seat frame moves upward and is expandable as the seat frame moves downward. The lever has a first end portion movable with the seat frame and a second end portion associated with the bracket. The lever bends as the seat frame moves vertically relative to the bracket. The sensor detects bending of the lever and provides an output signal indicative of the amount of bending of the lever.

Another feature of the present invention includes a bracket having a first curved engagement surface engaging an upper surface of the lever. The bracket further includes a second curved engagement surface engaging a lower surface of the lever.

Still another feature of the present invention includes a fastener with a longitudinal axis and a fastener member rotatable about the longitudinal axis. The fastener secures together the seat frame, the bracket, a member, and the lever. The bracket and the seat frame have cooperating engaging portions that inhibit rotation about the longitudinal axis of the bracket when the fastener member is rotated about the longitudinal axis.

Yet another feature of the present invention includes a bracket having a first portion for connection with the vehicle floor pan and a second portion for connection to the seat frame. The bracket further includes a hinge for allowing relative vertical movement between the first and second portions of the bracket during installation of the bracket onto the seat frame.

BRIEF DESCRIPTION OF THE DRAWINGS

The foregoing and other features of the invention will become more apparent to one skilled in the art upon consideration of the following description of the invention and the accompanying drawings, in which.

DESCRIPTION OF THE PREFERRED EMBODIMENTS

Figure 1:
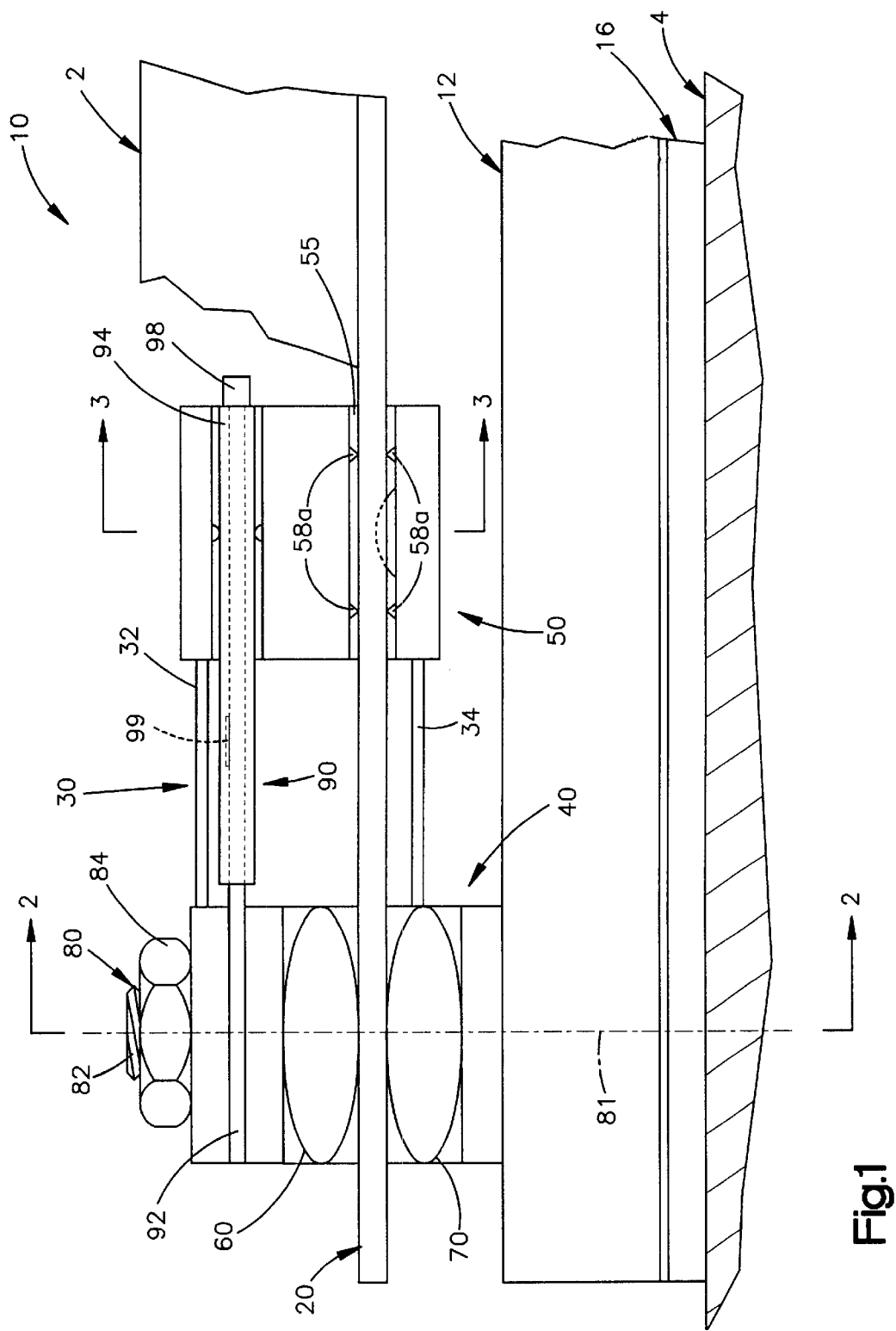
FIG. 1 is a schematic view of an apparatus embodying the present invention.
Figure 2:
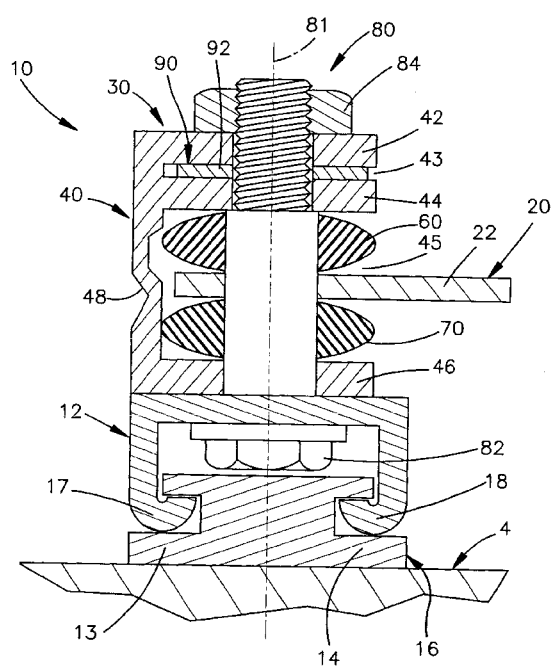
FIG. 2 is a schematic view of the apparatus of FIG. 1 taken along line 2—2 of FIG. 1.
Figure 3:
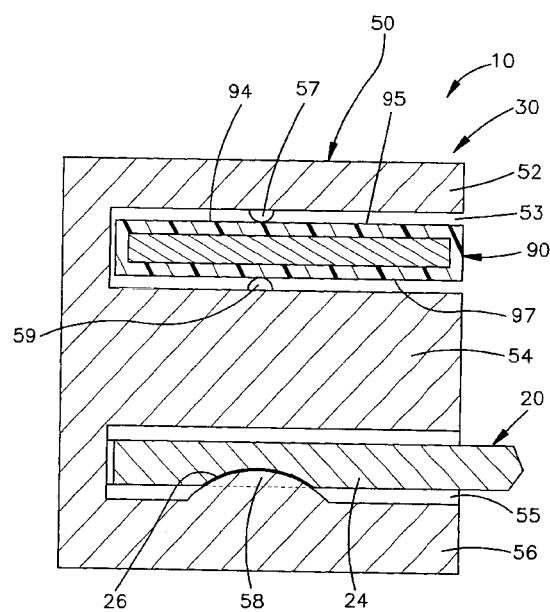
FIG. 3 is a schematic view of the apparatus of FIG. 1 taken along line 3—3 of FIG. 1.

According to an aspect of the present invention, as shown in FIGS. 1–3, a vehicle occupant load sensing apparatus 10 is used in a vehicle having a seat 2 for the vehicle occupant. A vehicle floor pan 4 supports the vehicle seat 2. The apparatus 10 includes a vehicle seat frame 20 for supporting the vehicle seat 2, a mounting bracket 30 for supporting the vehicle seat frame 20, an upper track 12 for supporting the bracket, a lower track 16 for adjustably supporting the upper track, a first resilient compressible member 60, a second resilient compressible member 70, a fastener assembly 80 including a fastener 82 with a longitudinal axis 81 and a fastener member 84 rotatable about the longitudinal axis 81 of the fastener, a generally rectangular lever 90 having a first end portion 92 and a second end portion 94 opposite the first end portion, and a sensor 99.

The vehicle seat frame 20 supports a weight load of the vehicle occupant in the vehicle seat 2. During a vehicle collision, the seat frame 20 may also sustain upward and lateral loads created by the vehicle collision. The load of the vehicle occupant in the vehicle seat 2 is transmitted through the bracket 30, upper track 12, and lower track 16 from the vehicle seat frame 20 to the vehicle floor pan 4.

The lower track 16 is fixedly attached to the vehicle floor pan 4. The lower track 16 has two opposite side rails 17, 18. The upper track 12 has two opposite rails 13, 14 that slidingly engage the side rails 17, 18 of the lower track 16. The upper track 12 may slide on the lower track 16 for manual forward or rearward adjustment of the position of the seat 2 for occupants of varying sizes, as is known in the art. The bracket 30 is thus supported by the upper track 12 so that it is vertically stationary and does not move as a result of loads applied to the vehicle seat 2.

The bracket 30 is typically constructed of a suitable metal such as steel. The bracket 30 has a first portion 40 for fixed connection to the upper track 12 and a second portion 50 for fixed connection to the seat frame 20. The first portion 40 of the bracket 30 is connected to the second portion 50 of the bracket 30 by two flexible connection portions 32, 34 of the bracket 30.

The flexibility of the connection portions 32, 34 allows relative vertical movement between the first and second portions 40, 50 of the bracket 30 during installation of the apparatus 10. After installation, the connection portions 40, 50 allow the first portion 40 of the bracket 30 to flexibly move vertically relative to the second portion 50 of the bracket 30 as the seat frame 20 moves vertically relative to the floor pan 4. This flexibility thereby allows the lever 90 to deflect in an amount proportional to the vertical load applied to the seat frame 20.

The first portion 40 of the bracket 30 is an E-shaped structure (as viewed in FIG. 2) having an upper horizontal projection 42, a middle horizontal projection 44, and a lower horizontal projection 46. The upper and middle projections 42, 44 form a first recess 43 therebetween for receiving the first end portion 92 of the lever 90. The middle projection 44 and the lower projection 46 form a second recess 45 therebetween for receiving the first and second compressible members 60, 70 and a first part 22 of the seat frame 20.

The first portion 40 of the bracket 30 includes a living hinge 48, integral to the bracket, that allows relative vertical movement between the upper and middle projections 42, 44 and the lower projection 46 of the first portion 40 of the bracket. The hinge 48 is constructed of a narrow portion of the bracket 30 that allows the bracket to deflect during installation of the bracket on the seat frame 20. The elasticity of the material of construction of the bracket 30 (i.e., metal, plastic, etc.) allows this deflection and determines the load required for this deflection.

The second portion 50 of the bracket 30 is also an E-shaped structure (as viewed in FIG. 3) having an upper horizontal projection 52, a middle horizontal projection 54, and a lower horizontal projection 56. The upper and middle projections 52, 54 form a third recess therebetween for receiving the second end portion 94 of the lever 90. The middle and lower projections 54, 56 form a fourth recess 55 therebetween for receiving a second part 24 of the seat frame 20 separate and apart from the first part 22 of the seat frame.

The lower surface of the upper projection 52 of the second portion 50 of the bracket 30 has a first curved, hemispherical engagement surface 57 extending downward into the third recess 53. The upper surface of the middle projection 54 of the second portion 50 has a second curved, hemispherical engagement surface 59 extending upward into the third recess 53. These engagement surfaces 57, 59 are integral to the upper and middle projections 52, 54.

The engagement surfaces 57, 59 may alternatively be formed by threaded bolts (not shown) with hemispherical end portions. The bolts may be threaded into openings in the upper and middle projections 52, 54 so that the hemispherical end portions extend into the third recess 53.

The first engagement surface 57 engages the planar upper surface 95 of the second end portion 94 of the lever 90. The second engagement surface 59 engages the planar lower surface 97 of the second end portion 94 of the lever 90. The first and second engagement surfaces 57, 59 form an essentially two point contact between the second portion 50 of the bracket 30 and the second end portion 94 of the lever 90. The engagement surfaces 57, 59 prevent vertical movement of the second end portion 94 of the lever 90 relative to the seat frame 20, but allow the second end portion 94 of the lever 90 to freely rotate, or "roll", between the engagement surfaces 57, 59 about horizontal and vertical axes (as viewed in FIG. 1). This rolling decouples, or relieves, any torsional stresses incurred by the lever 90 (i.e., tilting of the seat frame 20 during a vehicle collision) during installation or operation of the apparatus 10.

The upper surface of the lower projection 56 of the second portion 50 of the bracket 30 has a convex engaging surface portion 58 for engaging a cooperating concave engaging surface portion 26 on the second part 24 of the seat frame 20. The convex surface 58 portion limits relative rotation about the longitudinal axis 81 of the fastener 82 between the seat frame 20 and the bracket 30.

The lower surface of the middle projection 54 and the upper surface of the lower projection 56 of the second portion 50 of the bracket 30 each have two crushable ridges 58a that extend into the fourth recess 55. When the seat frame 20 is inserted into the fourth recess 55, the ridges 58a deform as necessary. These ridges 58a work with the convex surface portion 58 to form a secure fit between the second part 24 of the seat frame 20 and the second portion 50 of the bracket 30.

The first resilient compressible member 60 is interposed between the upper surface of the vehicle seat frame 20 and the lower surface of the middle projection 44 of the first portion 40 of the bracket 30 within the second recess 45. The second resilient compressible member 70 is interposed between the lower surface of the vehicle seat frame 20 and the upper surface of the lower projection 42 of the first portion 40 of the bracket 30 within the second recess 45.

The first and second resilient members 60, 70, typically resilient bushings, are compressible and expandable as the vertical load on the seat frame 20 increases or decreases. The resilient members 60, 70 are typically formed of rubber or other suitable elastomer.

The first end portion 92 of the lever 90 is thus fixedly associated with the first portion 40 of the mounting bracket 30. The second end portion 94 of the lever 90 is vertically fixed to, and movable with, the seat frame 20. The lever 90, typically an elastic metal such as stainless steel or aluminum, bends as the seat frame 20 moves vertically relative to the bracket 30. The second end portion 94 of lever 90 is over-molded with a polymer for environmentally sealing the sensor 99 mounted thereon. The second end portion 94 of the lever 90 has a greater vertical thickness than the unsealed first end portion 92 (as viewed in FIG. 1).

The sensor 99 is typically a strain gauge sensor that is applied to the second end portion 94 of the lever 90, preferably by a silk-screening process. The first end portion 92 of the lever 90 has an opening (not shown) for mounting the lever 90 to the bracket 30.

The fastener 82 may be a lateral guide bolt with a head that engages the lower surface of the upper track 12. The shaft of the fastener 82 extends upward through an opening in the upper track 12, an opening in the lower projection 46, an opening in the second compressible member 70, an opening in the seat frame 20, an opening in the first compressible member 60, an opening in the middle projection 44, the opening in the is first end portion 92 of the lever 90, and an opening in the upper projection 42.

The fastener member 84 may be a nut that is threaded onto the fastener 82 and engages the upper surface of the upper projection 42 of the first portion 40 of the bracket 30. The fastener 82 and fastener member 84 thereby secure these elements against lateral loads incurred by the vehicle seat 2 and/or the seat frame 20. This arrangement also prevents the sensor 99 from incurring lateral loads imparted to the seat frame 20.

The fastener member 84 may be tightened sufficiently against the upper projection 42 so that both the first and second compressible members 60, 70 are prestressed in a compressed condition without an external load being applied to the seat 2 or seat frame 20. The hinge 48 and/or the flexibility of the material of construction of the bracket 30 may facilitate this prestressing.

When a downward load is placed on the seat frame 20, the first compressible member 60, already compressed, expands against the middle projection 44 of the bracket 30 and the seat frame 20 as the seat frame is displaced downward. Correspondingly, the second compressible member 70 is further compressed by the seat frame 20 and the lower projection 46 of the bracket 30 as the seat frame is displaced downward.

When an upward load is placed on the seat frame 20, the first compressible member 60 is further compressed by the middle projection 44 of the bracket 30 and the seat frame 20 as the seat frame is displaced upward. Correspondingly, the second compressible member 70, already compressed, expands against the seat frame 20 and the lower projection 46 of the bracket 30 as the seat frame is displaced upward.

Figure 4:
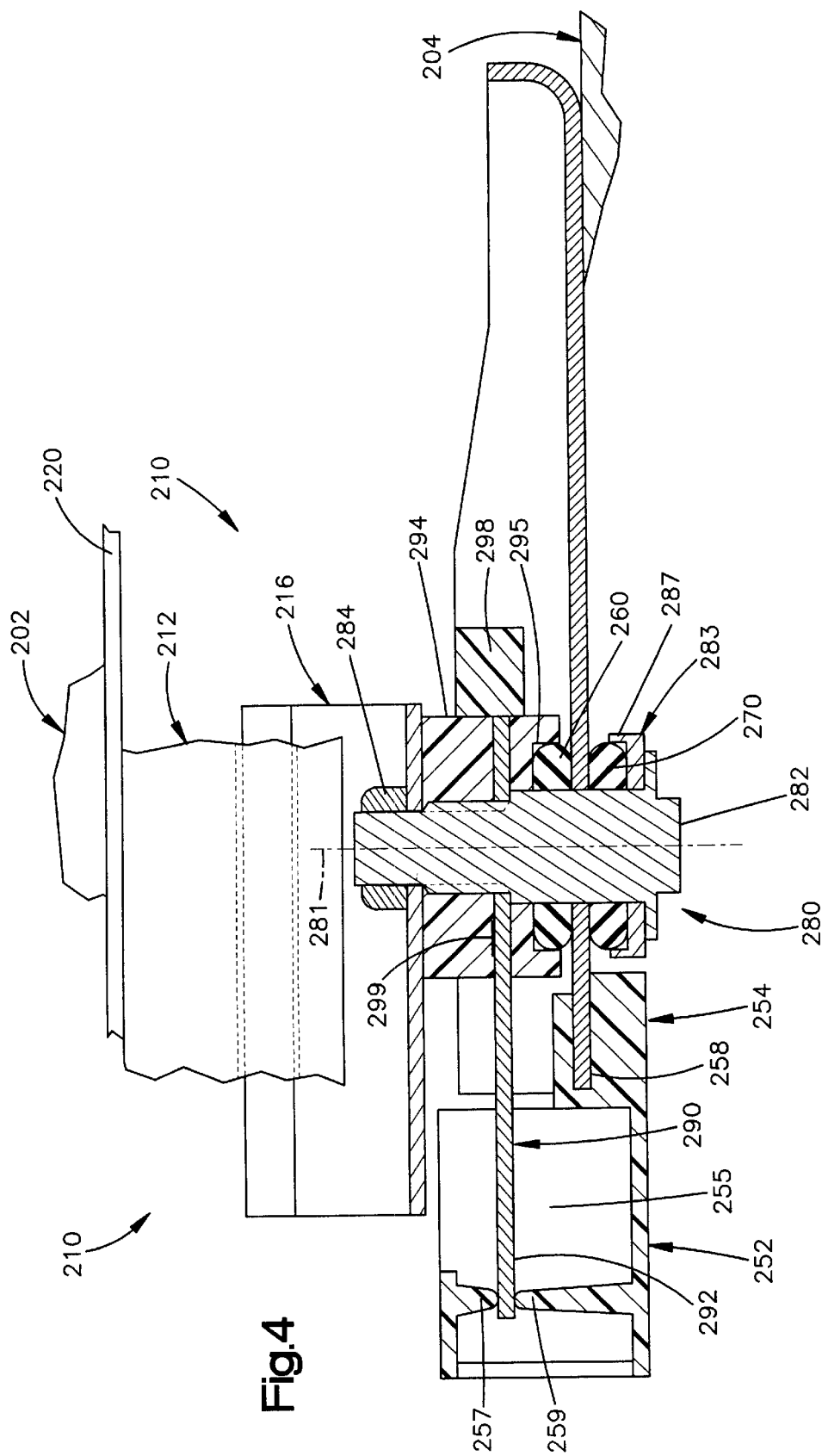
FIG. 4 is a schematic view of an apparatus embodying another aspect of the present invention.
Figure 5:
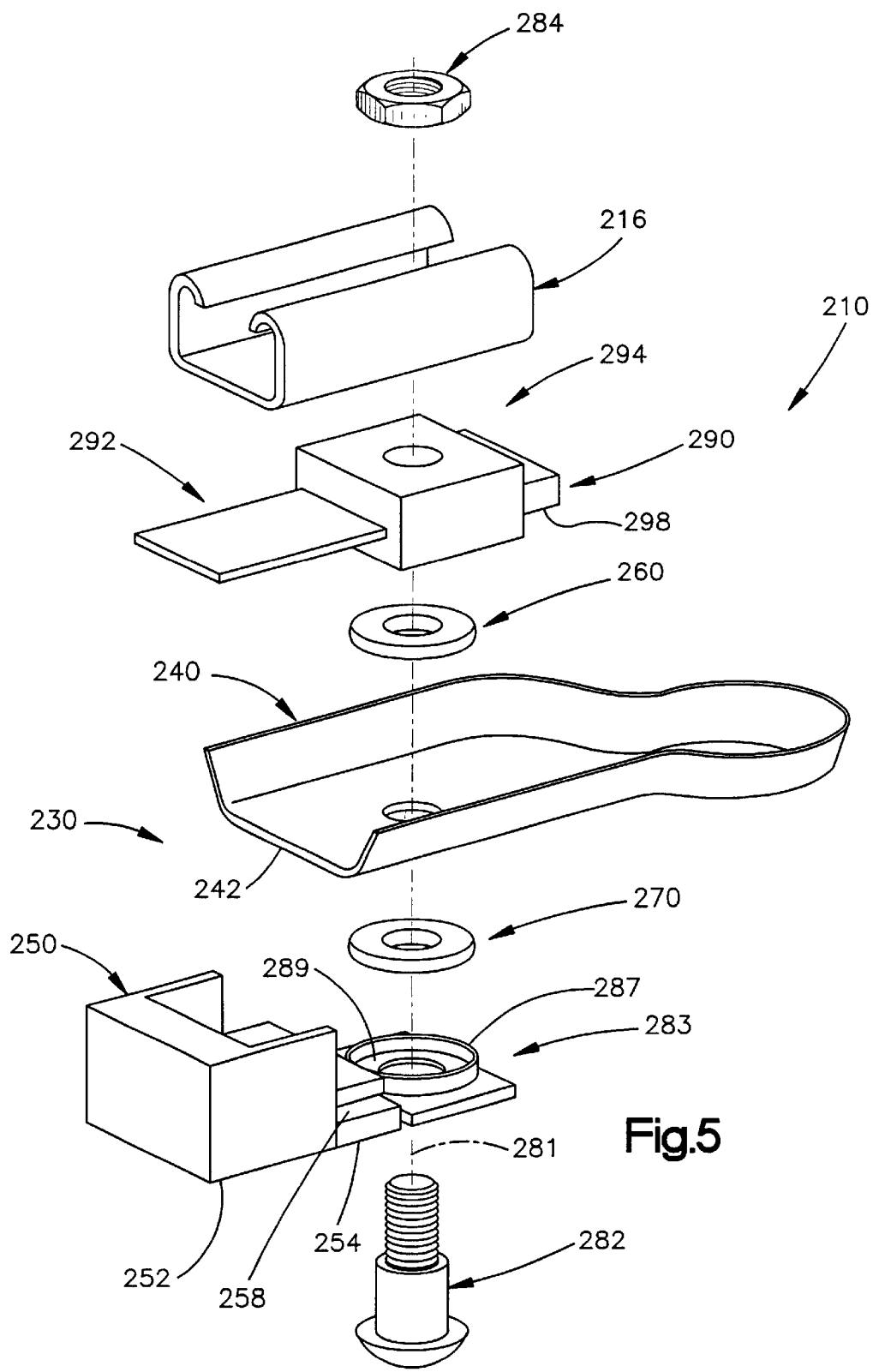
FIG. 5 is an exploded isometric view of the apparatus of FIG. 4.

According to a second aspect of the present invention, as shown in FIGS. 4–5, a vehicle occupant load sensing apparatus 210 is used in a vehicle having a seat 202 for the vehicle occupant. A vehicle floor pan 204 supports the vehicle seat 202. The apparatus 210 includes a vehicle seat frame 220 for supporting the vehicle seat 202, an upper track 212 for supporting the seat frame, a lower track 216 for adjustably supporting the upper track, a generally rectangular lever 290 having a first end portion 292 and a second end portion 294 opposite the first end portion, a first resilient compressible member 260, a bracket 230 having a first support structure 240 and a second support structure 250, a second resilient compressible member 270, a fastener assembly 280 having a fastener 282 with a longitudinal axis 281 and a fastener member 284 rotatable about the longitudinal axis, and a sensor 299.

The vehicle seat frame 220 supports a weight load of the vehicle occupant in the vehicle seat 202. During a vehicle collision, the seat frame 220 may also sustain upward and lateral loads by the vehicle occupant created by the vehicle collision. The load of the vehicle occupant in the vehicle seat 202 is transmitted through the upper track 212, lower track 216, and first support structure 240 from the vehicle seat frame 220 to the vehicle floor pan 204.

The lower track 216 has two opposite side rails. The upper track 212 has two opposite rails that slidingly engage the side rails of the lower track 216. The upper track 212 may slide on the lower track 216 for manual forward or rearward adjustment of the position of the seat 202 for occupants of varying sizes, as is known in the art.

The first support structure 240 is typically constructed of a suitable metal such as steel. The first support structure 240 is supported by, and fixed to, the vehicle floor pan 204 so that it is stationary and does not move vertically as a result of loads applied to the vehicle seat 202. This connection may be made by weld, mechanical fastener, or other suitable method known in the art.

The second support structure 250, or activator, is typically constructed of a suitable polymer such as plastic. The second support structure 250 is fixedly supported by the first support structure 240 and also is vertically stationary.

The second support structure 250 includes a first part 252 and a second part 254 opposite the first part. The first part 252 of the second support structure 250 has a cavity 255 for receiving the first end portion 292 of the lever 290, a first curved, hemispherical engagement surface 257 extending downward into the cavity 255 and a second curved, hemispherical engagement surface 259 extending upward into the cavity. The engagement surfaces 257, 259 are integral with the second support structure 250.

The engagement surfaces 257, 259 may alternatively be formed by threaded bolts (not shown) with hemispherical end portions. The bolts may be threaded into openings in the first part 252 of the second support structure 250 so that the hemispherical end portions extend into the cavity 255.

The first engagement surface 257 engages the planar upper surface of the first end portion 292 of the lever 290. The second engagement surface 259 engages the planar lower surface of the first end portion 292 of the lever 290. The first and second engagement surfaces 257, 259 form an essentially two point contact between the second support structure 250 and the first end portion 292 of the lever 290. The engagement surfaces 257, 259 prevent vertical movement of the first end portion 292 of the lever 290 relative to the second support structure 250, but allow the first end portion 292 of the lever 290 to freely rotate, or "roll", between the engagement surfaces 257, 259 about horizontal and vertical axes (as viewed in FIG. 4). This rolling decouples, or relieves, any torsional stresses incurred by the lever 290 (i.e., tilting of the seat frame 220 during a vehicle collision) during installation or operation of the apparatus 210.

The second part 254 of the second support structure 250 has a generally rectangular notch structure 258 for receiving a straight edge portion 242 of the first support structure 240. This configuration vertically supports the second support structure 250 on the first support structure 240 and limits rotation of the second support structure 250 about the longitudinal axis 281.

The first resilient compressible member 260 is interposed between the second end portion 294 of the lever 290 and the first support structure 240. The second resilient compressible member 270 is interposed between the first support structure 240 and the fastener 282.

The first and second resilient members 260, 270, typically resilient bushings, are compressible and expandable as the vertical load on the seat frame 220 increases or decreases. The resilient members 260, 270 are typically formed of rubber or other suitable elastomer.

The first end portion 292 of the lever 290 is vertically fixed to the second support structure 250. The second end portion 294 of the lever 290 is fixedly associated with, and movable with, the seat frame 220. The lever 290, typically an elastic metal such as stainless steel or aluminum, bends as the seat frame 220 moves vertically relative to the first and second support structures 240, 250.

The second end portion 294 of lever 290 is over-molded with a polymer for environmentally sealing the sensor 299 mounted thereon. The polymer may form a recess 295 for supporting and positioning the first compressible member 260 below the lever 290. The second end portion 294 of the lever 290 has a greater vertical thickness than the unsealed first end portion 292 (as viewed in FIG. 4).

The sensor 299 is typically a strain gauge sensor that is applied to the second end portion 294 of the lever 290, preferably by a silk-screening process. The second end portion 294 of the lever 290 has an opening (not shown) for mounting the lever to the lower track 216 and the seat frame 220.

The fastener assembly 280 includes a third support structure 283 for supporting and positioning the second compressible member 270. The third support structure 283 has an integral ring portion 287 that forms a recess 289 for mounting the second compressible member 270 in a position of symmetry about the longitudinal axis 281, similar to the recess 295 of the lever 290. The third support structure 283 is typically constructed of a suitable polymer such as plastic.

The fastener 282 may be a lateral guide bolt with a head that engages the lower surface of the third support structure 283. The shaft of the fastener 282 extends upward through an opening in the third support structure 283, an opening in the second compressible member 270, an opening in the first support structure 240, an opening in the first compressible member 260, an opening in the second end portion 294 of the lever 290, and an opening in the lower track 216.

The fastener member 284 may be a nut that is threaded onto the bolt and engages the lower track 216. The bolt and nut thereby secure these elements against lateral loads incurred by the vehicle seat 202 and/or the seat frame 220. This arrangement also prevents the sensor 299 from incurring lateral loads imparted to the seat frame 220.

The fastener member 284 may be tightened sufficiently against the lower track 216 so that both the first and second compressible members 260, 270 are prestressed in a compressed condition without an external load being applied to the seat 202 or seat frame 220. The flexibility of the material of construction of the lever 290 may facilitate this prestressing.

When a downward load is placed on the seat frame 220, the first compressible member 260 is further compressed by the second end portion 294 of the lever 290 and the first support structure 240 as the seat frame 220 is displaced downward. Correspondingly, the second compressible member 270, already compressed, expands against the first support structure 240 and the third support structure 283 as the seat frame 220 is displaced downward.

When an upward load is placed on the seat frame 220, the first compressible member 260, already compressed, expands against the second end portion 294 of the lever 290 and the first support structure 240 as the seat frame 220 is displaced upward. Correspondingly, the second compressible member 270 is further compressed by the first support structure 240 and the third support structure 283 as the seat frame 220 is displaced upward.

In either apparatus 10 or 210, any initial stresses incurred by the sensor due to initial bending of the lever by manufacturing tolerances or assembly tolerances (i.e., tightening of the fastener, etc.) may be factored out during an initial calibration of the sensor.

The lever essentially bends only in a vertical plane about a horizontal axis (as viewed in FIGS. 1 and 4). As stated earlier, torsional and lateral stresses are limited by the curved engagement surfaces securing an end portion of the lever.

The sensor produces an output signal directly proportional to the vertical force applied to the seat frame via the vehicle seat (i.e., the weight of the vehicle occupant, a load incurred during a vehicle collision, etc.). The sensor, while preferably a strain gauge sensor, may be any comparable sensor.

Either apparatus 10 or 210 may be placed at a corner of a rectangular seat frame and may be used in conjunction with other similar apparatuses to generate multiple signals (such as two at the front corners of a seat frame and two at rear corners of a seat frame). A wire harness may transmit the output signals from the apparatuses to an electrical controller.

The sensor may be electrically connected to the controller by lead wires running to connector plugs 98 or 298 mounted on the second end portion of the lever. The controller processes the signals from the apparatuses at each corner of the seat and generates an output signal indicative of the load on the seat frame. The multiple signals also can be analyzed by the controller to produce output signals for controlling occupant protection devices, such as an air bags, seat belt pretensioners, etc.

A seat belt assembly (not shown) may also be associated with the vehicle seat. The seat belt assembly would include a seat belt retractor, mounted for example to the vehicle floor pan, and a seat belt buckle connected to the bracket. The seat belt would extend from the retractor to the buckle across a vehicle occupant in the seat.

From the above description of the invention, those skilled in the art will perceive improvements, changes and modifications. Such improvements, changes and modifications are intended to be included within the scope of the appended claims.

Having described the invention, the following is claimed:

1. An apparatus for use in a vehicle having a seat for a vehicle occupant and a vehicle floor pan for supporting the vehicle seat, said apparatus comprising:

a vehicle seat frame for supporting a load of the vehicle occupant in the vehicle seat;

a bracket for transmitting the load of the vehicle occupant in the vehicle seat from the vehicle seat frame to the vehicle floor pan;

a first member interposed between said vehicle seat frame and said bracket, said first member being compressible as said seat frame moves downwardly and being expandable as said seat frame moves upwardly;

a second member interposed between said vehicle seat frame and said bracket, said second member being compressible as said seat frame moves upwardly and being expandable as said seat frame moves downwardly;

a lever having a first end portion movable with said seat frame and a second end portion associated with said bracket, said lever bending as said seat frame moves vertically relative to said bracket; and a sensor for detecting bending of said lever and providing an output signal indicative of the amount of bending of said lever.

2. The apparatus as defined in claim 1 wherein said sensor is located on a portion of said lever, said portion of said lever being over-molded with a polymer for environmentally sealing said sensor.

3. The apparatus as defined in claim 1 further including an upper track fixedly connected to said bracket, said upper track engaging a lower track and movable on said lower track for adjusting said seat for occupants of varying sizes.

4. The apparatus as defined in claim 1 further including a lateral guide bolt for securing said bracket, said members, and said seat frame together.

5. The apparatus as defined in claim 1 wherein said bracket includes a first curved engagement surface engaging an upper surface of said lever and a second curved engagement surface engaging a lower surface of said lever.

6. The apparatus as define in claim 1 further including a fastener with a longitudinal axis, said bracket and said seat frame having cooperating engaging portions for inhibiting rotation about said longitudinal axis.

7. The apparatus as defined in claim 1 wherein said bracket includes a first portion, a second portion, and a hinge for allowing relative vertical movement between said first and second portions of said bracket during installation of said bracket on said seat frame.

8. The apparatus as defined in claim 1 further including a nut for prestressing said first and second members into a compressed condition.

9. The apparatus as defined in claim 1 wherein said bracket includes a first portion for engaging said seat frame and a second portion for engaging said seat frame and the floor pan.

10. The apparatus as defined in claim 1 wherein said bracket includes a first support structure for engaging one of the end portions of said lever and a second support structure for engaging the other of said end portions of said lever.

11. An apparatus for use in a vehicle having a seat for a vehicle occupant and a vehicle floor pan for supporting the vehicle seat, said apparatus comprising:

a vehicle seat frame for supporting a load of the vehicle occupant in the vehicle seat;

a bracket for transmitting the load of the vehicle occupant in the vehicle seat from the vehicle seat frame to the vehicle floor pan;

a member interposed between said vehicle seat frame and said bracket, said member compressing as the load on said seat frame increases in a predetermined direction and expanding as the load on said seat frame decreases in said predetermined direction;

a lever having an upper surface, a lower surface, a first end portion movable with said seat frame, and a second end portion associated with said bracket, said lever bending as said seat frame moves vertically relative to said bracket; and a sensor for detecting bending of said lever and providing an output signal indicative of the amount of bending of said lever, said bracket further having a first curved engagement surface engaging said upper surface of said lever and a second curved engagement surface engaging said lower surface of said lever.

12. The apparatus as defined in claim 11 wherein said member is compressible as said seat frame moves downwardkly and expandable as said seat frame moves upwardly.

13. The apparatus as defined in claim 11 wherein said member is compressible as said seat frame moves upwardly and expandable as said seat frame moves downwardly.

14. The apparatus as define in claim 11 further including a fastener with a longitudinal axis, said bracket and said seat frame having cooperating engaging portions for inhibiting rotation about said longitudinal axis.

15. The apparatus as defined in claim 11 wherein said bracket includes a first portion, a second portion, and a hinge for allowing relative vertical movement between said first and second portions of said bracket during installation of said bracket on said seat frame.

16. An apparatus for use in a vehicle having a seat for a vehicle occupant and a vehicle floor pan for supporting the vehicle seat, said apparatus comprising:

a vehicle seat frame for supporting a load of the vehicle occupant in the vehicle seat;

a bracket for transmitting the load of the vehicle occupant in the vehicle seat from the vehicle seat frame to the vehicle floor pan;

a member interposed between said vehicle seat frame and said bracket, said member compressing as the load on said seat frame increases and expanding as the load on said seat frame decreases;

a lever having a first end portion movable with said seat frame and a second end portion associated with said bracket, said lever bending as said seat frame moves vertically relative to said bracket;

a sensor for detecting bending of said lever and providing an output signal indicative of the amount of bending of said lever; and a fastener having a longitudinal axis, said fastener securing together said seat frame, said bracket, said member, and said lever, said fastener including a fastener member rotatable about said longitudinal axis, said bracket and said seat frame having cooperating engaging portions which inhibit rotation about said longitudinal axis of said bracket when said fastener member is rotated about said longitudinal axis.

17. The apparatus as defined in claim 16 wherein said bracket includes a first curved engagement surface engaging an upper surface of said lever and a second curved engagement surface engaging a lower surface of said lever.

18. The apparatus as defined in claim 16 wherein said bracket includes a first portion, a second portion, and a hinge for allowing relative vertical movement between said first and second portions of said bracket during installation of said bracket on said seat frame.

19. The apparatus as defined in claim 16 wherein said member is compressible as said seat frame moves downwardly and expandable as said seat frame moves upwardly.

20. The apparatus as defined in claim 16 wherein said member is compressible as said seat frame moves upwardly and expandable as said seat frame moves downwardly.

21. An apparatus for use in a vehicle having a seat for a vehicle occupant and a vehicle floor pan for supporting the vehicle seat, said apparatus comprising:

a vehicle seat frame for supporting a load of the vehicle occupant in the vehicle seat;

a bracket for transmitting the load of the vehicle occupant in the vehicle seat from the vehicle seat frame to the vehicle floor pan, said bracket having a first portion for connection with the vehicle floor pan and a second portion for connection to said seat frame, said bracket further having a hinge for allowing relative vertical movement between said first and second portions of said bracket during installation of said bracket on said seat frame;

a member interposed between said vehicle seat frame and said bracket, said member compressing as the load on said seat frame increases and expanding as the load on said seat frame decreases;

a lever having a first end portion movable with said seat frame and a second end portion associated with said bracket, said lever bending as said seat frame moves vertically relative to said bracket; and a sensor for detecting bending of said lever and providing an output signal indicative of the amount of bending of said lever.

22. The apparatus as defined in claim 21 wherein said bracket includes a first curved engagement surface engaging an upper surface of said lever and a second curved engagement surface engaging a lower surface of said lever.

23. The apparatus as defined in claim 21 wherein said member is compressible as said seat frame moves downwardly and expandable as said seat frame moves upwardly.

24. The apparatus as defined in claim 21 wherein said member is compressible as said seat frame moves upwardly and expandable as said seat frame moves downwardly.

25. The apparatus as define in claim 21 further including a fastener with a longitudinal axis, said bracket and said seat frame having cooperating engaging portions for inhibiting rotation about said longitudinal axis.

* * * * *